No. 838,778. PATENTED DEC. 18, 1906.
F. W. ERICKSON.
INTERIOR CONDUIT BOX.
APPLICATION FILED FEB. 2, 1906.
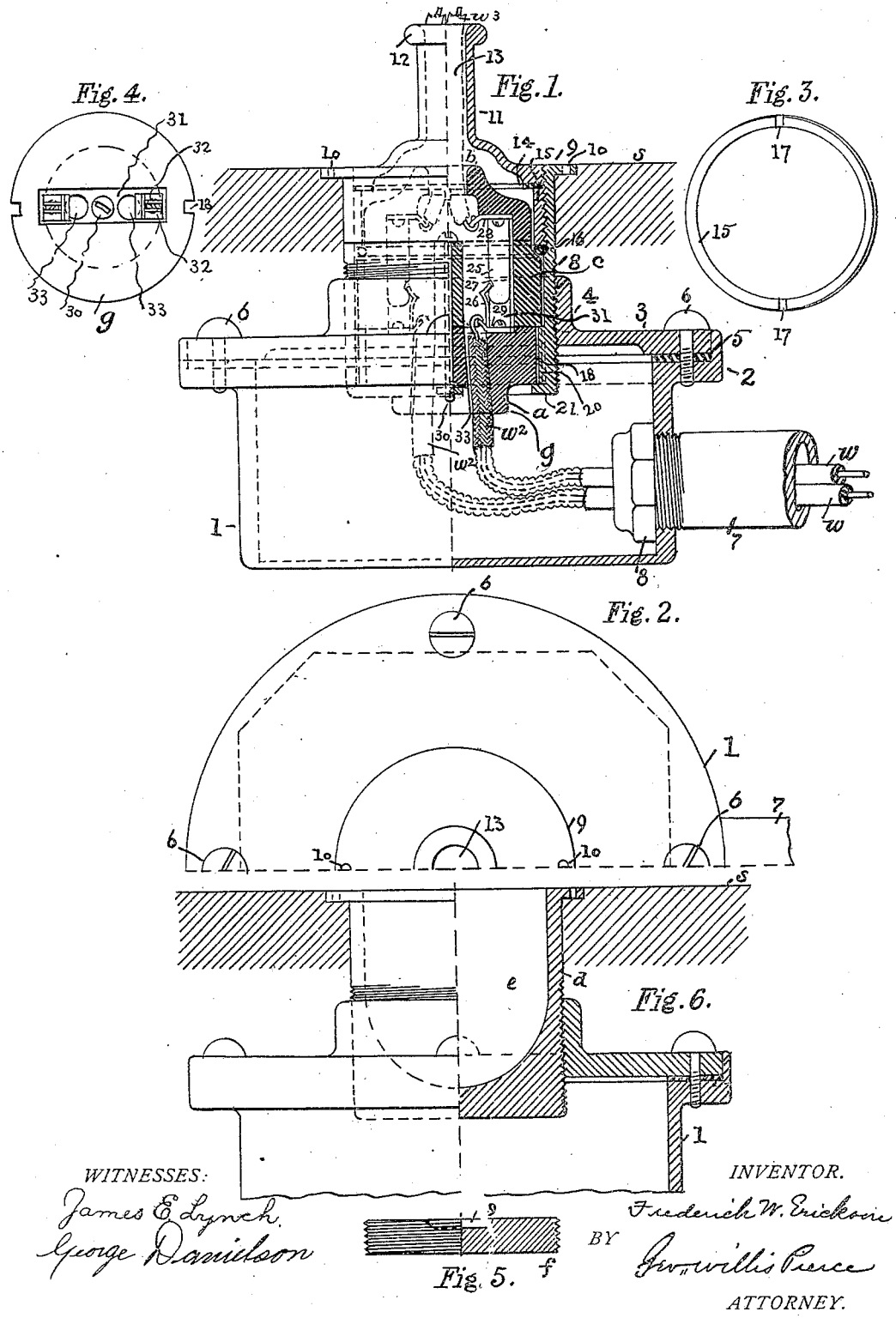
WITNESSES:
James E Lynch
George Danielson
INVENTOR.
Frederick W. Erickson
BY
Jno. Willis Pierce
ATTORNEY.

UNITED STATES PATENT OFFICE.

FREDERICK WM. ERICKSON, OF NEW YORK, N. Y., ASSIGNOR OF ONE-HALF TO FREDERIC W. LORD, OF IPSWICH, MASSACHUSETTS.

INTERIOR CONDUIT-BOX.

No. 838,778.        Specification of Letters Patent.        Patented Dec. 18, 1906.

Application filed February 2, 1906. Serial No. 299,093.

*To all whom it may concern:*

Be it known that I, FREDERICK WM. ERICKSON, residing at New York, in the county of New York and State of New York, have invented certain Improvements in Interior Conduit-Boxes, of which the following is a specification.

The invention about to be described relates to an improved construction of floor-boxes adapted to receive electric conduits and conductors at the places where they are brought into corridors or rooms of buildings on the level of the floor. Such boxes are designed to be used in a variety of electric service—such as electric lighting, power, and signaling of all kinds—and are arranged to contain fixtures, fuses, &c. From the nature of the application of such a box it is essential that it shall be perfectly water and dust proof and adapted to be adjustable in the floor or wall in which it is located, for my improved box may be used in walls and ceilings as well as in floors.

An important consideration in the invention is that but little of the structure shall be discernible on the floor-surface, and the portions of largest diameter are covered up by the floor-surface, leaving but a small area exposed.

In carrying out the invention I provide a box, preferably of cast-iron, of unrestricted dimensions, with flat sides, through which the conduits enter, which is located below the level of the floor, having a water and dust proof circular cover with an internally-screw-threaded opening, into which is screwed a hollow extension whose upper end has a flange which is flush with the top of the floor and forms a finish therewith.

When a building is in process of construction or before the wearing-surface of the floor is laid, the box is put in place and a temporary or false adjustable extension is inserted, which serves as a level or templet for the upper surface of the floor and is so constructed as to keep dirt from falling into the box, and when the conductors are to be run and connected this extension is removed and a tubular adjustable extension inserted, into which is placed a porcelain device or receptacle which supports the conductors, which device is held in place by a ring, and the mouth of the extension is closed by a tubular cap, through which the conductors pass to the translating devices, such as lamps.

In the drawings, which illustrate the invention, Figure 1 is a side elevation of the invention, one-half of which is in section. Fig. 2 is a half plan view of Fig. 1. Fig. 3 is an end view of the adjusting-ring. Fig. 4 is an end view of the porcelain device. Fig. 5 is an edge view, in one-half section, of a floor-plug. Fig. 6 is a side elevation of the invention, one-half in section, showing the temporary extension in position.

In the drawings, 1 is a cast-iron box of unrestricted dimensions in which may be located any desired appliance or device, but is represented simply as a connecting-box preferably of octagon cross-section in order that square surfaces may be had for the introduction through holes in the same of iron conduits 7, which are secured to the side of the box by the thimble 8, which is screwed onto the internal end of the conduit, through which the insulated conductors $w\,w$ enter the box. The box-cover 3 has a rubber gasket 5 between it and the top of the box and is screwed thereto by the screws 6. The cover has a central circular opening surrounded by a collar 4, which is internally screw-threaded.

The box 1 is secured to the floor-foundation in any suitable manner before the floor itself is laid, at which time a false or temporary adjustable extension $d$, having its central upper portion $e$ hollow, as shown, a flange 9 at its upper end which has the spanner-holes 10 10 on opposite sides and is externally threaded to engage the collar 4. This extension-cylinder is screwed into the collar 4 by means of a spanner, whose points engage the holes 10 10, and is adjusted to project therefrom the proper distance to serve as a templet for the surface of the floor, and when in that position also acts as a plug to keep dust and dirt from the box.

When the connections are to be made, the extension $d$ is removed and the permanent adjustable extension 8 is inserted in its place, and as its body and flange are the same as the extension $d$ it fits into the position occupied by said extension $d$. The extension 8 is tubular and has a lip 21 at its lower end and is provided on the lower inside with the opposite vertically-extending splines 20, while its upper end is internally screw-threaded. Until the box is to be used a floor-blank $f$ is screwed into the upper end of the extension, a slot 19 in its top being made for the use of a screw-driver to turn the same. When power-conductors $w$ are to be led out from the conduit, a porcelain receptacle or device $a$, composed of the parts $c$, $b$, and $g$, is inserted into the extension, and an adjusting or holding ring 15 is screwed, by means of the spanner-slots 17 17, into the extension upon a rubber ring 16, which rests upon the shoulder of the part $c$, and a rubber gasket 14 is placed upon the top of the ring, and finally a hollow cap-piece 11 is screwed into the upper end of the extension onto the said gasket. The cap has a broad base and a narrow nipple-like upper part, its inner surface rounding outwardly. The lower porcelain part $g$ has opposite longitudinal channels 18 in its outer surface, which embrace the splines 20 on the inside of the extension to prevent its turning. In its top part are the brass bases 29, secured by bolts, to which the short insulated conductors $w^2$ $w^2$ are soldered, their opposite ends hanging down into the box. The central porcelain piece $c$ is secured to the piece $g$ by the bolt 30, which extends through central holes in the two pieces, it having a nut on its lower end. The upper porcelain piece $b$ is smaller in diameter than the lower pieces in order to provide room for the ring 15 and terminates in a small orifice at the top, which communicates with a hollow interior, in which and secured to the upper side are the metal base-pieces 28, to which the conductors $w^3$ may be soldered, and depending from each base-piece is a flat metal connecting-shank having a notch 27 on its inner side. On each side of the center of the piece $c$ is a channel 31, and when the upper part $b$ is placed upon the piece $c$ the shanks pass through the said channels, and their notches 27 engage the springs 22 and are locked thereto. Extending upward from the base-pieces 29 on each side thereof are springs 32 32, between which the shanks are pressed as they become locked as aforesaid and assist in making good electrical contacts. This receptacle $a$ as assembled, with short insulated conductors $w^2$ $w^2$ soldered to the base-pieces and extending downward through the holes 33 in the piece $g$, forms an article of manufacture and when inserted in the extension and the conductors $w$ $w$ and $w^3$ $w^3$ soldered, as described, enables continuous conductors to be employed without binding-posts.

A space is provided between the upper part of the piece $b$ and the under side of the base of the nozzle-piece in order that if the conductors $w^3$ become strained from any cause the piece $b$ may be pulled upward and the shanks 25 be withdrawn from the engaging springs and the circuits opened.

When connections are to be made between the conductors $w$ $w$ and the conductors $w^2$ $w^2$, the porcelain receptacle $a$ is removed from the extension and the former conductors are drawn out, and the conductors $w$ and $w^2$ are soldered together, taped, and the receptacle replaced, and the loose bights of the conductors are disposed inside the box 1. At the same time the terminal conductors $w^3$ $w^3$ are placed through the nozzle 11 and soldered to the base-pieces 28 28.

It will be seen by this principle of construction the box 1, being wholly concealed under the floor, may be of any size required, while the extension portions 8 or $d$ may be of small diameter and area, and therefore not obtrusive or in the way.

In boxes of ordinary construction the cover of the box is brought to or quite near the surface of the floor and is not less in size than its box, and all connections are made in the box directly, usually with binding-posts, while in the present invention the conductors are brought outside the box in order to make the connections. By this method soldered connections may be easily made, which cannot be done in the constructions referred to.

I claim as my invention—

1. A floor or wall box adapted to receive conduits through its walls which are octagonal in plan; a circular water-tight cover having a central circular opening surrounded by a screw-threaded collar; an adjustable tubular extension screw-threaded to engage the said collar with an inner lip at its lower end and a flange at its upper end; an insulating receptacle or device inclosed in said extension resting upon said lip and secured therein by an adjustable ring and having insulated conductors extending downward into the box, and means for continuing circuits from said conductors through the said receptacle to the upper end of the extension, as set forth.

2. A floor or wall box adapted to receive conduits through its walls which are octagonal in plan; a circular water-tight cover having a central circular opening surrounded by a screw-threaded collar; an adjustable tubular extension screw-threaded to engage the said collar with an inner lip at its lower end and a flange at its upper end; an insulating receptacle or device inclosed in said extension resting upon said lip and secured therein by an adjustable ring and having insulated conductors extending downward into the box, and means for continuing circuits from said conductors through the said receptacle to the upper end of the extension the area of the box plan being substantially larger than the area of the upper end of the said extension, substantially as set forth.

3. A floor or wall box adapted to receive conduits through its walls which are octagonal in plan; a circular water-tight cover having a central circular opening surrounded by a screw-threaded collar; an adjustable tubular extension screw-threaded to engage said collar, and an inner lip at its lower end and a flange at its upper end; a nozzle-piece screwed into the upper end of the extension; an insulating or porcelain receptacle or device inclosed in said extension composed of three portions, the lower two bolted together, resting upon said lip and held thereto by an adjustable ring, insulated conductors extending downward therefrom into the box, the upper portion of the receptacle having end play toward the nozzle-piece; and means for continuing the said conductors through the upper end of the extension and nozzle-piece, as set forth.

4. A floor or wall box adapted to receive conduits through its walls which are octagonal in plan; a circular water-tight cover having a central circular opening surrounded by a screw-threaded collar; an adjustable tubular extension screw-threaded to engage said collar, having one or more vertical splines and an inner lip at its lower end and a flange at its upper end; a nozzle-piece screwed into the upper end of the extension; an insulating or porcelain receptacle or device inclosed in said extension composed of three portions resting upon said lip and held thereto by an adjustable ring, provided with slots to engage said splines, having insulated conductors extending downward into the box, the upper part of the receptacle having end play toward the nozzle-piece; and means for continuing the said conductors through the upper end of the extension and nozzle-piece, as set forth.

5. An insulating or porcelain receptacle for continuing circuits from conduits to translating devices made in three portions resting upon and adapted to be locked to each other, the upper portion is rounded at its top and has a central orifice into an interior, the central portion is provided with central and side vertical orifices, and the third portion has central and side orifices registering with those of the second portion, the first portion is provided in its interior with duplicate metal pieces composed of means for connection with conductor-terminals, and of blades extending downward into the said side orifices of the second portion, and the third portion is provided with duplicate metal pieces composed of means for connection with conductor-terminals and of extensions adapted to engage the said blades, the second and third portions being secured to each other by a bolt passing through their said central orifices.

6. An insulating or porcelain receptacle for continuing circuits from conduits to translating devices, consisting of three cylinders resting upon and adapted to be locked to each other, the upper cylinder has a central orifice into an enlarged interior, the central cylinder is provided with a central and side vertical orifices, and the third cylinder has central and side orifices registering with those of the second cylinder, the first cylinder is provided in its interior with duplicate metal pieces composed of means for connection with conductor-terminals, and of notched blades extending downward into the said side orifices of the second cylinder, and the third cylinder is provided with duplicate metal pieces composed of means for connection with conductor-terminals and of spring extensions adapted to engage the said notched blades, the second and third cylinders being secured to each other by a bolt passing through their said central orifices.

7. A floor or wall box adapted to receive conduits through its walls which are octagonal in plan and with flat surfaces, a circular flange around its top; a circular cover having a central opening surrounded by an internally-threaded collar, and a gasket between the said flange and the cover; an adjustable tubular extension outwardly screw-threaded at its lower end to engage said collar and internally threaded at its upper side with an inner lip at its lower end and a flange at its upper end an adjustable ring and a nozzle-piece with an interposed gasket engaging the internally-threaded upper end of the extension; an insulating or porcelain receptacle within the extension composed of three parts, the two lower parts bolted together and resting on said lip and held in place by said ring, with an interposed gasket, the upper part having end play toward the nozzle-piece, as set forth.

8. As an article of manufacture, an insulating or porcelain receptacle for continuing circuits from conduits to translating devices made in three portions resting upon and adapted to be locked to each other, the upper portion has a central orifice into an interior, the central portion is provided with central and side vertical orifices, and the third portion has central and side orifices registering with those of the second portion, the first portion is provided in its interior with duplicate metal pieces composed of means for connection with conductor-terminals and means for engaging and locking with similar means located in the third portion, and the third portion is provided with duplicate metal pieces composed of means connected with the terminals of short lengths of conductors, and of extensions adapted to engage with the said locking means of the first portion, the second and third portions being secured to each other by a bolt passing through their said central orifices.

9. As an article of manufacture, an insulating receptacle for continuing circuits from conduits to translating devices, consisting of two separable parts, the upper part having duplicate means for connection with conductor-terminals and for locking with similar means in the lower part, the said duplicate means in the lower part being permanently connected with the terminals of short lengths of conductors.

In testimony whereof I have signed my name to this specification, in the presence of two subscribing witnesses, this 1st day of February, 1906.

FREDERICK WM. ERICKSON.

Witnesses:
FREDERIC W. LORD,
W. E. SOBEY.